(12) United States Patent
Haas

(10) Patent No.: US 8,186,942 B2
(45) Date of Patent: May 29, 2012

(54) NACELLE ASSEMBLY WITH TURBULATORS

(75) Inventor: Martin Haas, Columbia, CT (US)

(73) Assignee: United Technologies Corporation, Hartford, CT (US)

( * ) Notice: Subject to any disclaimer, the term of this patent is extended or adjusted under 35 U.S.C. 154(b) by 1174 days.

(21) Appl. No.: 11/956,460

(22) Filed: Dec. 14, 2007

(65) Prior Publication Data

US 2009/0155067 A1 Jun. 18, 2009

(51) Int. Cl.
*F01B 25/02* (2006.01)
*B64C 33/02* (2006.01)

(52) U.S. Cl. ...................... 415/145; 244/53 B

(58) Field of Classification Search .................. 415/144, 415/145, 185; 244/1 N, 53 B
See application file for complete search history.

(56) References Cited

U.S. PATENT DOCUMENTS

| | | |
|---|---|---|
| 2,948,111 A | 5/1955 | Nelson |
| 2,915,262 A | 12/1959 | Klein |
| 3,059,878 A | 10/1962 | Kerry et al. |
| 3,074,232 A | 1/1963 | Soyer |
| 3,119,581 A | 1/1964 | Trevaskis |
| 3,222,863 A | 12/1965 | Klees et al. |
| 3,298,637 A | 1/1967 | Shao-Tang Lee |
| 3,422,624 A | 1/1969 | Brooks et al. |
| 3,524,611 A | 8/1970 | Frank |
| 3,532,100 A | 10/1970 | Hilton |
| 3,541,794 A | 11/1970 | Johnston et al. |
| 3,568,694 A | 3/1971 | Johnson |
| 3,575,259 A | 4/1971 | Wilkinson |
| 3,583,417 A | 6/1971 | Clark |
| 3,611,724 A | 10/1971 | Kutney |
| 3,618,699 A | 11/1971 | Evans |
| 3,623,328 A | 11/1971 | Pike |
| 3,623,494 A | 11/1971 | Poucher |
| 3,652,036 A | 3/1972 | Sans et al. |
| 3,662,556 A | 5/1972 | Poucher et al. |
| 3,664,612 A | 5/1972 | Skidmore et al. |
| 3,699,682 A | 10/1972 | Kleckner |
| 3,736,750 A | 6/1973 | Britt |
| 3,763,874 A | 10/1973 | Wilde et al. |
| 3,770,228 A | 11/1973 | Traksel et al. |
| 3,905,566 A | 9/1975 | Anderson |
| 4,007,891 A | 2/1977 | Sorensen |
| 4,012,013 A | 3/1977 | Ball et al. |
| 4,044,973 A | 8/1977 | Moorehead |

(Continued)

FOREIGN PATENT DOCUMENTS

EP 0516468 12/1992

(Continued)

OTHER PUBLICATIONS

U.S. Appl. No. 11/595,040, filed Nov. 10, 2006, Winter, et al.

(Continued)

*Primary Examiner* — Edward Look
*Assistant Examiner* — Dwayne J White
(74) *Attorney, Agent, or Firm* — Carlson Gaskey & Olds P.C.

(57) ABSTRACT

A nacelle assembly for a turbine engine has a cowl. The cowl extends along an axis and has an exterior surface spaced from an interior surface. The interior surface forms an air inlet for directing airflow to the turbine engine. A turbulator for creating turbulence is disposed on one of the interior surface and the exterior surface.

18 Claims, 3 Drawing Sheets

U.S. PATENT DOCUMENTS

| | | |
|---|---|---|
| 4,083,181 A | 4/1978 | Adamson |
| 4,132,240 A | 1/1979 | Frantz |
| 4,147,029 A | 4/1979 | Sargisson |
| 4,154,256 A | 5/1979 | Miller |
| 4,199,295 A | 4/1980 | Raffy et al. |
| 4,220,171 A | 9/1980 | Ruehr et al. |
| 4,475,702 A | 10/1984 | Cole |
| 4,540,143 A | 9/1985 | Wang |
| 4,722,357 A | 2/1988 | Wynosky |
| 4,738,416 A | 4/1988 | Birbragher |
| 4,865,268 A | 9/1989 | Tracksdorf |
| 4,899,958 A | 2/1990 | Horikawa |
| 4,912,921 A | 4/1990 | Rice et al. |
| 4,993,663 A | 2/1991 | Lahti et al. |
| 5,000,399 A | 3/1991 | Readnour et al. |
| 5,012,639 A | 5/1991 | Ream et al. |
| 5,014,933 A | 5/1991 | Harm et al. |
| 5,058,617 A | 10/1991 | Stockman et al. |
| 5,127,222 A | 7/1992 | Ream et al. |
| 5,141,182 A | 8/1992 | Coffinberry |
| 5,143,329 A | 9/1992 | Coffinberry |
| 5,145,126 A | 9/1992 | Patilla |
| 5,156,362 A | 10/1992 | Leon |
| 5,177,957 A | 1/1993 | Grieb |
| 5,261,227 A | 11/1993 | Giffin, III |
| 5,284,012 A | 2/1994 | Laborie et al. |
| 5,297,765 A | 3/1994 | Hughes et al. |
| 5,351,476 A | 10/1994 | Laborie et al. |
| 5,357,742 A | 10/1994 | Miller |
| 5,361,828 A | 11/1994 | Lee et al. |
| 5,447,283 A | 9/1995 | Tindell |
| 5,568,724 A | 10/1996 | Lindner et al. |
| 5,586,431 A | 12/1996 | Thonebe et al. |
| 5,593,112 A | 1/1997 | Maier et al. |
| 5,725,182 A | 3/1998 | Valleroy |
| 5,727,380 A | 3/1998 | Lardy et al. |
| 5,732,547 A | 3/1998 | Olsen et al. |
| 5,743,488 A | 4/1998 | Rolston et al. |
| 5,803,410 A | 9/1998 | Hwang |
| 5,813,625 A | 9/1998 | Hassan et al. |
| 5,841,079 A | 11/1998 | Parente |
| 5,934,611 A | 8/1999 | Tindell et al. |
| 5,971,328 A | 10/1999 | Kota |
| 5,987,880 A | 11/1999 | Culbetson |
| 6,055,805 A | 5/2000 | El-Aini et al. |
| 6,089,505 A | 7/2000 | Gruensfelder et al. |
| 6,109,566 A | 8/2000 | Miller et al. |
| 6,129,309 A | 10/2000 | Smith et al. |
| 6,129,311 A | 10/2000 | Welch et al. |
| 6,170,253 B1 | 1/2001 | Newton |
| 6,179,251 B1 | 1/2001 | Tindell et al. |
| 6,231,006 B1 | 5/2001 | Gruensfelder et al. |
| 6,259,976 B1 | 7/2001 | Lemelson et al. |
| 6,260,567 B1 | 7/2001 | Gruensfelder et al. |
| 6,334,753 B1 | 1/2002 | Tillman et al. |
| 6,340,135 B1 | 1/2002 | Barton |
| 6,360,989 B1 | 3/2002 | Maguire |
| 6,375,118 B1 | 4/2002 | Kibens et al. |
| 6,379,110 B1 | 4/2002 | McCormick et al. |
| 6,390,418 B1 | 5/2002 | McCormick et al. |
| 6,471,477 B2 | 10/2002 | Hassan et al. |
| 6,651,929 B2 | 11/2003 | Dionne |
| 6,655,632 B1 | 12/2003 | Gupta |
| 6,698,691 B2 | 3/2004 | Porte |
| 6,708,711 B2 | 3/2004 | Surply et al. |
| 6,763,651 B2 | 7/2004 | Shmilovich et al. |
| 6,764,043 B2 | 7/2004 | Sankrithi et al. |
| 6,793,177 B2 | 9/2004 | Bonutti |
| 6,971,229 B2 | 12/2005 | Lair |
| 7,048,229 B2 | 5/2006 | Sanders et al. |
| 7,048,230 B2 | 5/2006 | Meyer |
| 7,090,165 B2 | 8/2006 | Jones et al. |
| 7,131,612 B2 | 11/2006 | Baptist et al. |
| 7,165,744 B2 | 1/2007 | Howarth et al. |
| 7,255,309 B2 | 8/2007 | Boldrin et al. |
| 7,617,670 B2 | 11/2009 | Truax et al. |
| 7,735,601 B1 * | 6/2010 | Stieger et al. ............ 181/213 |
| 7,739,865 B2 | 6/2010 | Prasad et al. |
| 7,766,280 B2 | 8/2010 | Cloft et al. |
| 7,802,760 B2 | 9/2010 | Webster |
| 7,870,721 B2 | 1/2011 | Winter et al. |
| 2004/0237534 A1 | 12/2004 | Webster et al. |
| 2005/0060982 A1 | 3/2005 | Mani et al. |
| 2005/0274103 A1 | 12/2005 | Prasad et al. |
| 2006/0155432 A1 | 7/2006 | Brown |
| 2007/0221788 A1 | 9/2007 | Meister |
| 2008/0092548 A1 | 4/2008 | Morford et al. |
| 2008/0112799 A1 | 5/2008 | Winter et al. |
| 2008/0267762 A1 | 10/2008 | Jain et al. |
| 2008/0283676 A1 | 11/2008 | Jain et al. |
| 2008/0286094 A1 | 11/2008 | Jain |
| 2009/0003997 A1 | 1/2009 | Jain et al. |
| 2009/0008508 A1 | 1/2009 | Jain et al. |
| 2009/0121083 A1 | 5/2009 | Jain |

FOREIGN PATENT DOCUMENTS

| | | |
|---|---|---|
| EP | 0694740 | 1/1996 |
| EP | 1382379 | 1/2004 |
| FR | 980347 | 12/1950 |
| GB | 1070458 | 6/1967 |
| GB | 1312619 | 4/1973 |
| GB | 1336724 | 11/1973 |
| GB | 1382809 | 2/1975 |

OTHER PUBLICATIONS

U.S. Appl. No. 11/584,030, filed Oct. 20, 2006, Morford, et al.
U.S. Appl. No. 11/749,260, filed May 16, 2007, Jain, et al.
U.S. Appl. No. 11/739,216, filed Apr. 24, 2007, Jain, et al.
U.S. Appl. No. 11/750,398, filed May 18, 2007, Jain, et al.
U.S. Appl. No. 11/772,287, filed Jul. 2, 2007, Jain, et al.
U.S. Appl. No. 11/769,749, filed Jun. 28, 2007, Jain, et al.
Extended European Search Report for Application No. 08252429.9 mailed Nov. 26, 2008.
Extended European Search Report for Application No. EP 07 25 4305 dated Aug. 19, 2011.
Extended European Search Report for Application No. EP 08 25 1047 dated Sep. 6, 2011.
Extended European Search Report for Application No. EP 08 25 2263 dated Aug. 19, 2011.
Extended European Search Report for Application No. EP 08 25 3874.5 dated Jan. 25, 2012.

* cited by examiner

NACELLE ASSEMBLY WITH TURBULATORS

BACKGROUND OF THE INVENTION

This invention relates to a nacelle assembly for a gas turbine engine, particularly for an aircraft.

For a gas turbine engine, such as a turbo fan engine, air is pressurized in a compressor and mixed with fuel in a combustor to generate hot combustion gases. These gases flow downstream through the turbine stages of the engine, which extract energy from the gases. In a two spool gas turbine engine, a high pressure turbine powers a high pressure compressor, while a low pressure turbine powers the fan section disposed upstream of the compressor and a low pressure compressor.

Combustion gases are discharged from the turbo fan engine through a core exhaust nozzle while fan air is discharged through an annular fan exhaust nozzle defined at least partially by a nacelle surrounding the core engine. A majority of the propulsion thrust is provided by the pressurized fan air, which is discharged through the fan exhaust nozzle. The remaining thrust is provided by the combustion gases discharged through the core exhaust nozzle.

It is known in the field of aircraft gas turbine engines that the performance of the turbo fan engine varies during diverse flight conditions experienced by the aircraft. An inlet lip section located at the foremost edge of the turbo fan nacelle is typically designed to enable operation of the turbo fan engine and prevent the separation of airflow from the inlet lip section of the nacelle during these diverse flight conditions. For example, the inlet lip section requires a "thick" inlet lip section designed to support operation of the turbo fan during specific flight conditions, such as cross-wind conditions, take-off and the like. Disadvantageously, the "thick" inlet lip section may reduce the efficiency of the turbo fan engine during cruise conditions of the aircraft, which conditions exist for the large majority of the flight of the aircraft.

A need therefore exists to optimize the performance of a turbo fan gas turbine engine during diverse flight conditions so as to reduce the nacelle thickness and its associated drag.

SUMMARY OF THE INVENTION

A nacelle assembly for a turbine engine has a cowl. The cowl extends along an axis and has an exterior surface spaced from an interior surface. The interior surface forms an air inlet for directing airflow to the turbine engine. A turbulator for creating turbulence is disposed on one of the interior surface and the exterior surface.

The various features and advantages of this invention will become apparent to those skilled in the art from the following detailed description. The drawings that accompany the detailed description can be briefly described as follows.

DETAILED DESCRIPTION OF THE PREFERRED EMBODIMENT

Figure 1:
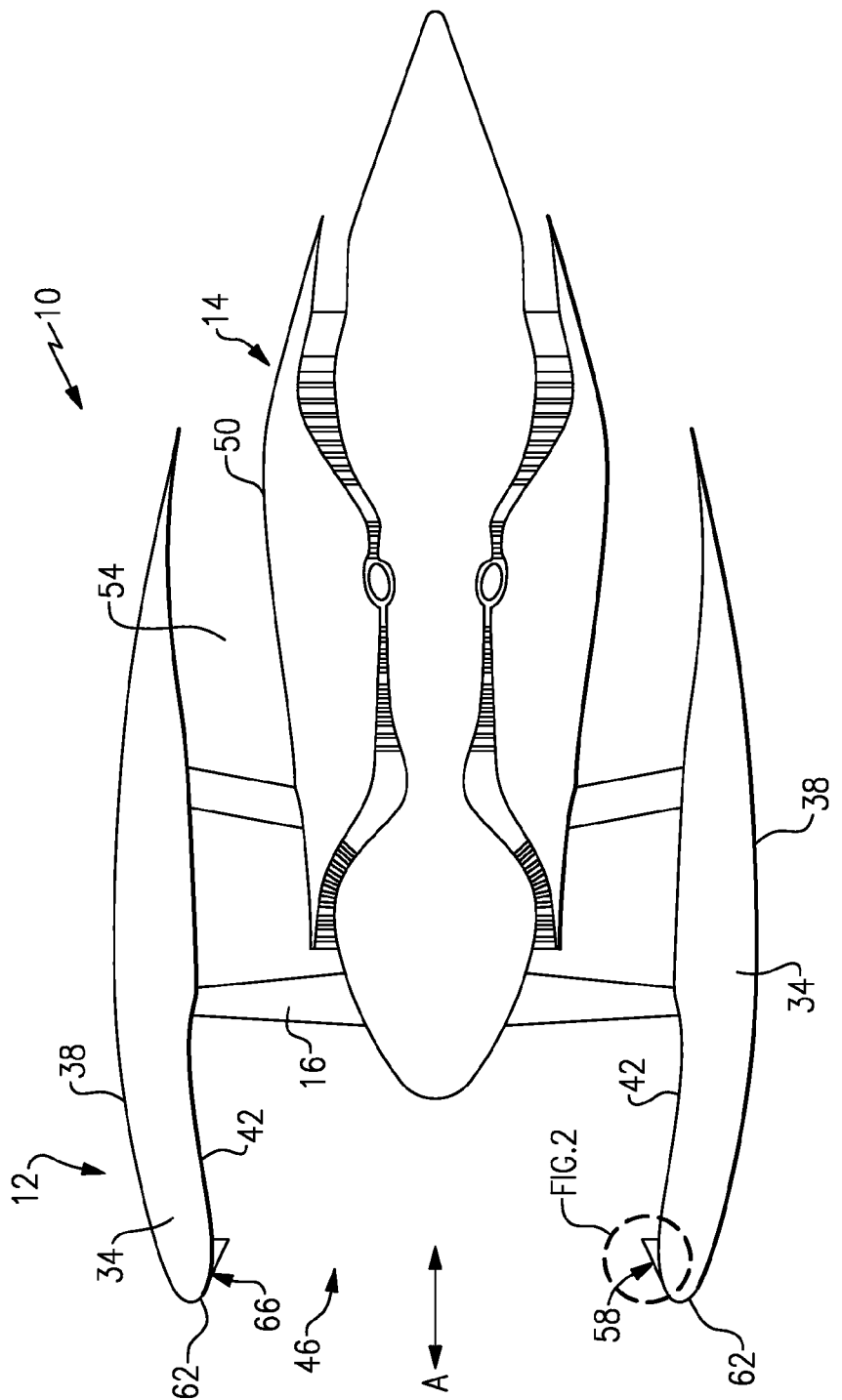
FIG. 1 illustrates a side cross-sectional view of a gas turbine engine, including the present nacelle.

FIG. 1 illustrates a gas turbine engine assembly 10. There is shown turbine engine 14 having fan 16. Turbine engine 14 has core cowl 50 spaced from fan cowl 34. Fan cowl 34 forms part of nacelle assembly 12. Between fan cowl 34 and core cowl 50 is bypass flow passage 54, which is in fluid communication with fan 16 as known.

Fan cowl 34 extends circumferentially around axis A and is formed by exterior surface 38 and interior surface 42. Interior surface 42 forms air inlet 46 for fan 16. Exterior surface 38 and interior surface 42 meet to form lip 62. Due to the necessity of accommodating differing flight conditions, a lip of a nacelle assembly is typically thicker than necessary for normal flight conditions, such as cruising.

To reduce the effective thickness of a lip and overall thickness of a fan cowl, lip 62 has turbulators, such as first turbulator 58 and second turbulator 66. First turbulator 58 is circumferentially and radially displaced about axis A from second turbulator 66. Additional turbulators may be provided circumferentially along a line between first turbulator 58 and second turbulator 66. In addition, turbulator, such as first turbulator 58 and second turbulator 66, may be placed on exterior surface 38 and lip 62.

Figure 2:
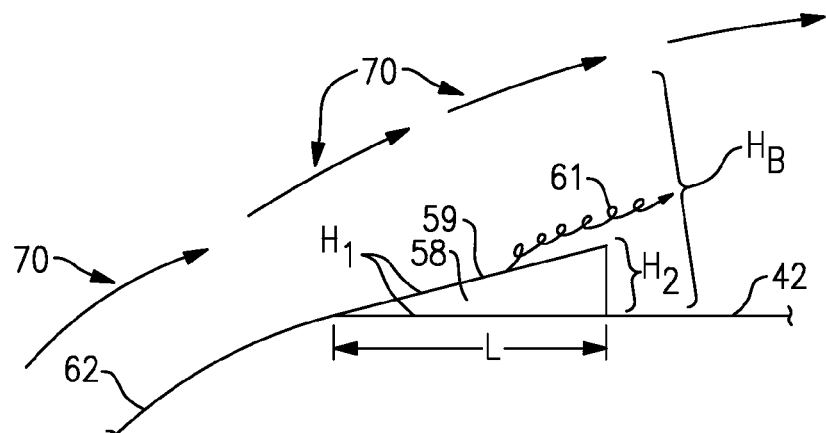
FIG. 2 illustrates a close up view of the nacelle assembly of FIG. 1, highlighting a turbulator on an interior surface of the nacelle.
Figure 3:
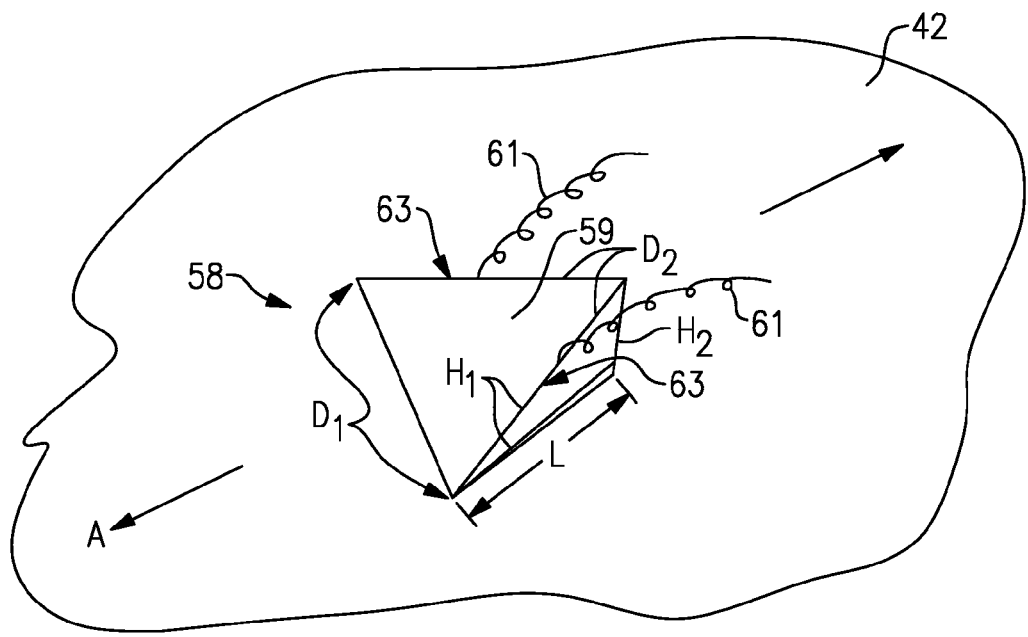
FIG. 3 illustrates a perspective view of the turbulator of FIG. 2.

As shown in FIG. 2, first turbulator 58, which is also shaped in the same way as second turbulator 66, has ramp 59 that extends from interior surface 42. Ramp 59 has height $H_1$ and height $H_2$ as shown in FIGS. 2 and 3. In addition, with reference to FIG. 3, ramp 59 is shaped like a triangle and has first dimension $D_1$, here a width, and second dimension $D_2$, here another width. While first turbulator 58 and second turbulator 66 have a triangle shape, they may have other shapes.

With reference to FIGS. 2 and 3, ramp 59 also has length L. As shown in FIG. 2, height $H_2$ is greater than height $H_1$. In addition, length L of ramp 59 is greater than heights $H_2$. For example, length L may be five times larger than $H_2$ to allow for a gradual increase in height of ramp 59. In addition, $D_1$ may also be five times larger than height $H_2$.

With reference to FIG. 2, it is anticipated that boundary layer 70 of airflow across lip 62 and interior surface 42 will have height anticipated boundary layer height $H_B$. Height $H_2$ may be smaller than height $H_B$, for example, approximately ⅓ height $H_B$. With reference to FIG. 3, airflow across ramp 59 will create turbulence 61, such as vortex flow, from edges 63 of ramp 59. Consequently, airflow will be energized by turbulence 61. By energizing the boundary layer of airflow into air inlet 46, lip 62 may be reduced in thickness as compared to other lips while still creating an acceptable flow through fan cowl 34.

Figure 4:
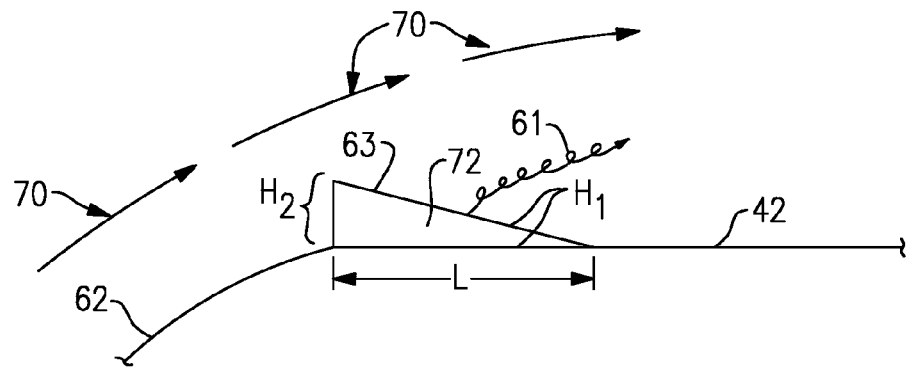
FIG. 4 illustrates another turbulator on an interior surface of a nacelle assembly.
Figure 5:
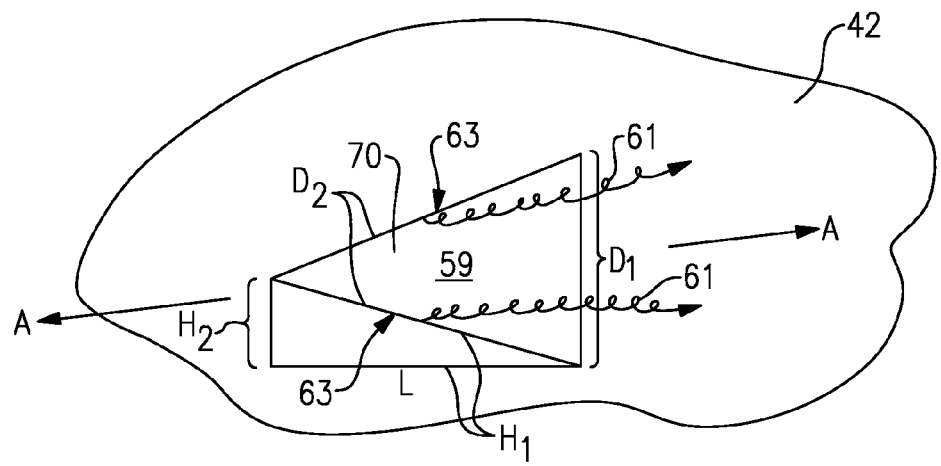
FIG. 5 illustrates a perspective view of the turbulator of FIG. 4.

With reference to FIG. 4, there is provided third turbulator 72. With reference to FIG. 4 and 5, third turbulator 72 is identical to first turbulator 58, having length L and height $H_1$ and height $H_2$, as well as first dimension $D_1$ and second dimension $D_2$. The difference between third turbulator 72 and first turbulator 58 is the orientation of ramp 59. With reference to FIG. 4 and 5, ramp 59 is oriented such that height $H_2$ is closer to lip 62 than height $H_1$. Consequently, ramp 59 plows boundary layer 70 and turbulence 61 is created by edges 63. Again, boundary layer 70 is energized, permitting an effective reduction in the size of lip 62.

The foregoing description shall be interpreted as illustrative and not in any limiting sense. A worker of ordinary skill in the art would recognize that certain modifications would come within the scope of this invention. For that reason, the follow claims should be studied to determine the true scope and content of this invention.

We claim:

1. A nacelle assembly for a turbine engine, comprising:
a cowl for a turbine engine, said cowl extending along an axis and having an exterior surface spaced from an interior surface, said interior surface forming an air inlet for directing air flow to the turbine engine; and
a first turbulator for creating turbulence disposed on one of said interior surface and said exterior surface, wherein said first turbulator has a first height extending from one of said interior surface and said exterior surface, and said turbulator has a second height, said second height different from said first height.

2. The nacelle assembly of claim 1 wherein said turbulator protrudes from one of said interior surface and said exterior surface.

3. The nacelle assembly of claim 1 wherein said interior surface and said exterior surface define a lip, said turbulator located proximate said lip.

4. The nacelle assembly of claim 1 including a second turbulator on one of said interior surface and said exterior surface, wherein said second turbulator is spaced from said first turbulator circumferentially around said axis.

5. The nacelle assembly of claim 1 wherein said first turbulator has a first width dimension and a second width dimension, said first width dimension and said second width dimension extending across said axis, said first width dimension axially spaced upstream of said second width dimension, wherein said first width dimension is different from said second width dimension.

6. The nacelle assembly of claim 5 wherein said first width dimension is larger than said second width dimension.

7. The nacelle assembly of claim 5 wherein said first width dimension is smaller than said second width dimension.

8. The nacelle assembly of claim 1 wherein said first height is based on an anticipated boundary layer height of air flow across one of said interior surface and said exterior surface.

9. The nacelle assembly of claim 8 wherein said turbulator has a length extending along said axis, said length greater than said first height.

10. The nacelle assembly of claim 1 wherein said first height is axially spaced upstream from said second height.

11. The nacelle assembly of claim 10 wherein said first height is smaller than said second height.

12. The nacelle assembly of claim 10 wherein said first height is larger than said second height.

13. A nacelle assembly for a turbine engine, comprising:
a cowl for a turbine engine extending along an axis, said cowl extending along an axis and having an exterior surface spaced from an interior surface, said interior surface forming an air inlet for directing air flow to the turbine engine;
a first turbulator for creating turbulence disposed on said interior surface, said turbulator protruding a first height or a second height from said interior surface, the first height different than the second height; and
wherein said interior surface and said exterior surface define a lip, said turbulator located proximate said lip.

14. The nacelle assembly of claim 13 wherein said first turbulator has a first width dimension and a second width dimension, said first width dimension and said second width dimension extending across said axis, said first width dimension axially spaced upstream of said second width dimension, wherein said first width dimension is different from said second width dimension.

15. The nacelle assembly of claim 14 wherein said first width dimension is axially spaced upstream of said second width dimension.

16. A turbine engine assembly, comprising:
a turbine engine;
a fan cowl for said turbine engine, said fan cowl extending along an axis and having an exterior surface spaced from an interior surface, said interior surface forming an air inlet for directing air flow to the turbine engine;
a core cowl extending at least partially about said turbine engine, said fan cowl spaced from said core cowl to define a bypass flow passage; and
a first turbulator for creating turbulence disposed on one of said interior surface and said exterior surface, said turbulator protruding from one of said interior surface and said exterior surface,
wherein said first turbulator has a height extending from one of said interior surface and said exterior surface, and the height varies between a first height and a second height that is different than the first height.

17. The turbine engine assembly of claim 16 wherein said first turbulator has a first width dimension and a second width dimension, said first width dimension and said second width dimension extending across said axis, said first width dimension axially spaced upstream of said second width dimension, wherein said first width dimension is different from said second width dimension.

18. The turbine engine assembly of claim 16 wherein said interior surface and said exterior surface define a lip, said turbulator located proximate said lip.

* * * * *